(12) United States Patent
Tarifa

(10) Patent No.: US 10,798,298 B1
(45) Date of Patent: Oct. 6, 2020

(54) FLICKER DETECTOR

(71) Applicant: Facebook Technologies, LLC, Menlo Park, CA (US)

(72) Inventor: Mariano Jos Jaimez Tarifa, Zurich (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/382,101

(22) Filed: Apr. 11, 2019

Related U.S. Application Data

(63) Continuation-in-part of application No. 16/268,295, filed on Feb. 5, 2019, now abandoned.

(51) Int. Cl.
*H04N 5/232* (2006.01)
*H04N 5/353* (2011.01)
*H04N 5/247* (2006.01)
*H04N 5/235* (2006.01)

(52) U.S. Cl.
CPC ....... *H04N 5/23232* (2013.01); *H04N 5/2357* (2013.01); *H04N 5/247* (2013.01); *H04N 5/3535* (2013.01)

(58) Field of Classification Search
CPC .. H04N 5/2357; H04N 5/2353; H04N 5/3532; H04N 9/735; H04N 17/00; H04N 5/23212; H04N 5/235; H04N 5/2355; H04N 5/2351; H04N 5/3535; G03G 15/2039

See application file for complete search history.

(56) References Cited

U.S. PATENT DOCUMENTS

| | | | |
|---|---|---|---|
| 9,686,505 B2* | 6/2017 | Liu | H04N 5/21 |
| 10,602,111 B2* | 3/2020 | Zhao | H04N 5/3572 |
| 2006/0158531 A1* | 7/2006 | Yanof | H04N 5/2357 348/226.1 |
| 2010/0123810 A1* | 5/2010 | Greenland | H04N 5/2357 348/294 |
| 2011/0255786 A1* | 10/2011 | Hunter | H04N 5/21 382/190 |

* cited by examiner

*Primary Examiner* — Hung H Lam
(74) *Attorney, Agent, or Firm* — Baker Botts L.L.P.

(57) ABSTRACT

In one embodiment, a computing system receives one or more signals indicative of light intensities captured by one or more cameras. These signals are captured in a plurality of frames at a first frame rate. The computing system calculates light intensity metrics for each frame of the plurality of frames based on the one or more signals captured in the respective frames. The computing system detects one or more peaks based on the light intensity metrics associated with one or more frames of the plurality of frames. The one or more frames were captured in a predetermined time period. The computing system determines a likelihood of perceptible flicker based on the detected one or more peaks. The computing system causes the one or more cameras to capture frames at a second frame rate in response to a determination that the likelihood of perceptible flicker exceeds a predetermined threshold.

18 Claims, 6 Drawing Sheets

FLICKER DETECTOR

PRIORITY

This application is a continuation-in-part under 35 U.S.C. § 120 of U.S. patent application Ser. No. 16/268,295, filed 5 Feb. 2019.

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. A virtual reality system may render a virtual environment, which may include a virtual space that is rendered for display to one or more users. The users may view and interact within this virtual space and the broader virtual environment through any suitable means. In particular embodiments, the virtual reality system may generate a virtual space to present to the user. As an example and not by way of limitation, the virtual reality system may generate a virtual arena to place the user within. In particular embodiments, the virtual reality system may present a real-world view to the user. The process of presenting a real-world view to a user through a virtual reality system may include capturing a real-world view through inside-out cameras and rendering the images for the user to view. During the capturing process, there may be perceptible flicker detected by the virtual reality system and seen by the user if the frequency of the light sources within the real-world view are different from the frame rate at which the virtual reality system is capturing the real-world view. The perceptible flicker may result in a negative experience for the user by not representing the real-world view accurately. Additionally, the perceptible flicker may also cause a decrease in tracking quality as a result of unstable images. One goal of the disclosed methods is to detect and eliminate any perceptible flicker. In particular embodiments, the virtual reality system may provide a method of detecting perceptible flicker within a view presented to the user. To eliminate the perceptible flicker, the virtual reality system may detect the perceptible flicker and cause the frame rate to change to a suitable frame rate.

To determine a perceptible flicker, in particular embodiments, the virtual reality system may take each frame and calculate a light intensity metric associated with each frame. As an example and not by way of limitation, the virtual reality system may calculate a mean light intensity for each frame. In particular embodiments, the virtual reality system may take the frames captured within a given time period (e.g., 1 minute) and divide the frames into equal sets of frames. The equal sets of frames may represent a grouping of frames. In particular embodiments, the virtual reality system may detect the number of peaks of light intensity within each set of frames and compare the detected number of peaks to a threshold number of peaks associated with a minimum and maximum for a likelihood of perceptible flicker. Where below the minimum may represent no likelihood of perceptible flicker and above the maximum may represent a strong possibility of perceptible flicker. In particular embodiments, the peaks may correspond to minima and maxima detected within the set of frames. In particular embodiments, the virtual reality system may determine a likelihood of perceptible flicker based on the number of detected peaks within a set of frames. Each of the set of frames may represent a time interval and the likelihood of perceptible flicker may correspond to the respective time interval. In particular embodiments, the likelihood of perceptible flicker may also account for the historical likelihood of perceptible flicker (e.g., associated with previous sets of frames or time intervals). In particular embodiments, the virtual reality system may use a logarithm-odds equation to determine the likelihood of perceptible flicker. In particular embodiments, after the virtual reality system determines a likelihood of perceptible flicker above a threshold likelihood, the virtual reality system may send a notification to the user of a likelihood of perceptible flicker. In addition, in particular embodiments, the virtual reality system may present an interactive element which is selectable to cause the cameras to capture frames at a different frame rate.

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to provide an intuitive experience for users—one that gives the users a sense of "presence," or the feeling that they are actually in the virtual environment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
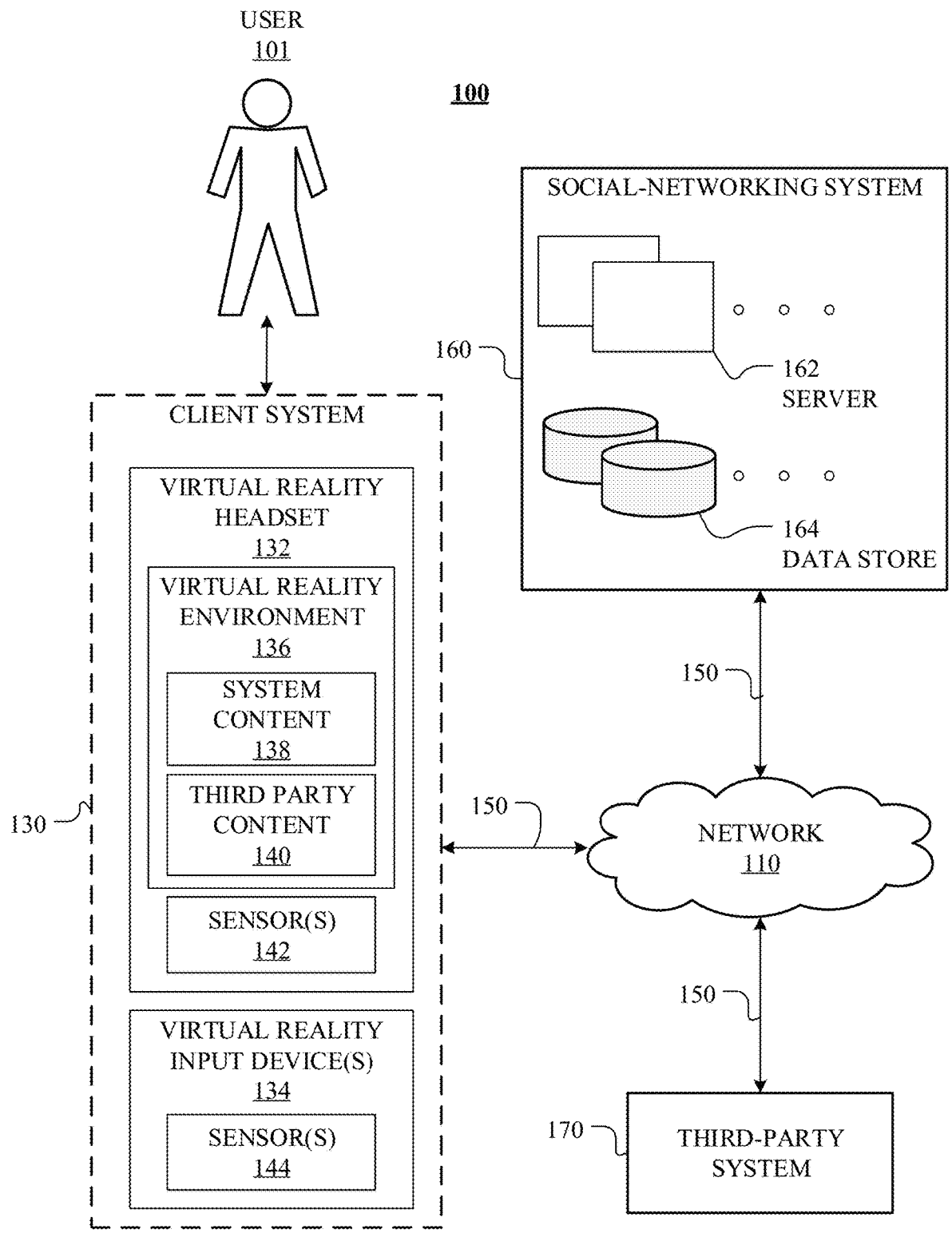
FIG. 1 illustrates an example network environment associated with a virtual reality system.

FIG. 1 illustrates an example network environment 100 associated with a virtual reality system. Network environment 100 includes a user 101 interacting with a client system 130, a social-networking system 160, and a third-party system 170 connected to each other by a network 110. Although FIG. 1 illustrates a particular arrangement of a user 101, a client system 130, a social-networking system 160, a third-party system 170, and a network 110, this disclosure contemplates any suitable arrangement of a user 101, a client system 130, a social-networking system 160, a third-party system 170, and a network 110. As an example and not by way of limitation, two or more of a user 101, a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple users 101, client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130. A client system 130 may generate a virtual reality environment for a user to interact with content.

In particular embodiments, a client system 130 may include a virtual reality (or augmented reality) headset 132, such as OCULUS RIFT and the like, and virtual reality input device(s) 134, such as a virtual reality controller. A user at a client system 130 may wear the virtual reality headset 132 and use the virtual reality input device(s) to interact with a virtual reality environment 136 generated by the virtual reality headset 132. Although not shown, a client system 130 may also include a separate processing computer and/or any other component of a virtual reality system. A virtual reality headset 132 may generate a virtual reality environment 136, which may include system content 138 (including but not limited to the operating system), such as software or firmware updates and also include third-party content 140, such as content from applications or dynamically downloaded from the Internet (e.g., web page content). A virtual reality headset 132 may include sensor(s) 142, such as accelerometers, gyroscopes, magnetometers to generate sensor data that tracks the location of the headset device 132. The headset 132 may also include eye trackers for tracking the position of the user's eyes or their viewing directions. The client system may use data from the sensor(s) 142 to determine velocity, orientation, and gravitation forces with respect to the headset. Virtual reality input device(s) 134 may include sensor(s) 144, such as accelerometers, gyroscopes, magnetometers, and touch sensors to generate sensor data that tracks the location of the input device 134 and the positions of the user's fingers. The client system 130 may make use of outside-in tracking, in which a tracking camera (not shown) is placed external to the virtual reality headset 132 and within the line of sight of the virtual reality headset 132. In outside-in tracking, the tracking camera may track the location of the virtual reality headset 132 (e.g., by tracking one or more infrared LED markers on the virtual reality headset 132). Alternatively or additionally, the client system 130 may make use of inside-out tracking, in which a tracking camera (not shown) may be placed on or within the virtual reality headset 132 itself. In inside-out tracking, the tracking camera may capture images around it in the real world and may use the changing perspectives of the real world to determine its own position in space.

Third-party content 140 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser to a particular server (such as server 162, or a server associated with a third-party system 170), and the web browser may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser of a third-party content 140, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
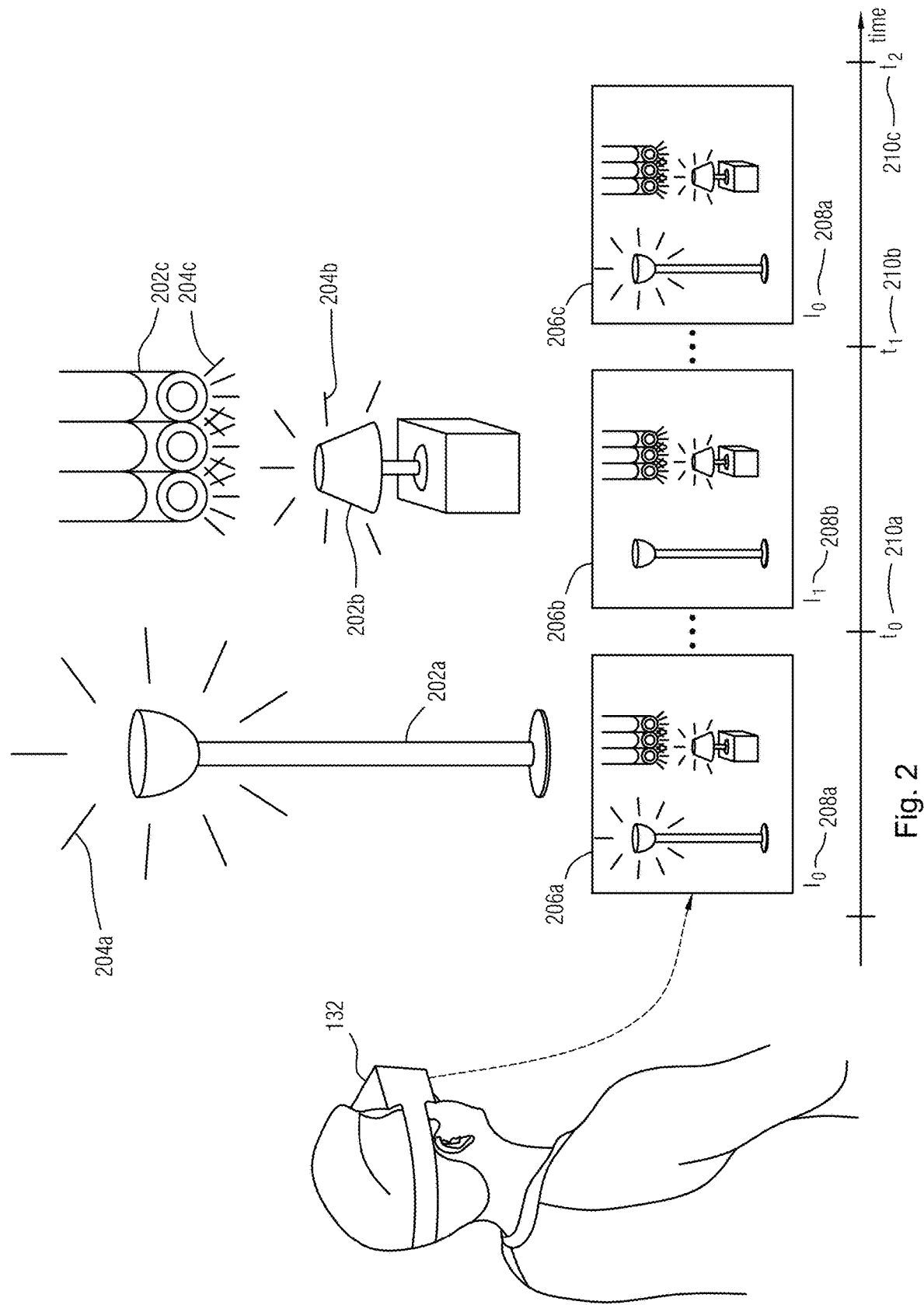
FIG. 2 illustrates an example of a user interacting with a virtual reality system.

FIG. 2 illustrates an example of a user interacting with a virtual reality system. In particular embodiments, a client system 130 or a virtual reality system may render a virtual space for display to a user on a display device. In particular embodiments, the virtual reality system may be a local system that includes devices present locally with respect to a user of the virtual reality system. In particular embodiments, the virtual reality system may be a remote device (e.g., a remote server computing machine) or may at least include a remote device. As an example and not by way of limitation, the virtual reality system may be defined to include a server of the social-networking system 160. As another example and not by way of limitation, the virtual reality system may be defined to include a server of the social-networking system 160 as well as a local computing device. In particular embodiments, the virtual space may be an augmented reality space in which virtual elements are overlaid on the real world. As an example and not by way of limitation, the virtual reality system may continuously capture images of the real world (e.g., using a camera on the headset of the user) and overlay virtual objects or avatars of other users on these images, such that a user may interact simultaneously with the real world and the virtual world. In particular embodiments, the user may view the virtual space using a headset device. As an example and not by way of limitation, referencing FIG. 2, the user may mount a virtual reality headset 132 on the user's head. In particular embodiments, the headset device may be a device that may be mounted, placed, or otherwise connected to the user's head. In particular embodiments, the headset device may include a display mechanism that displays a region of the virtual space to the user. As an example and not by way of limitation, the display mechanism may include a screen that displays the region of the virtual space. As another example and not by way of limitation, the display mechanism may be a projector that directly projects a display of the region of the virtual space to an optimal point in the user's eyes (e.g., to the fovea of each of the user's eyes). While a virtual space may be projected to the user, a real-world view may be presented to the user as shown in FIG. 2. The real-world view may be presented to the user through the use or inside-out cameras as a series of frames captured by the inside-out cameras.

In particular embodiments, the virtual reality headset 132 may use one or more inside-out cameras to receive signals from a plurality of light sources 202a-202c. In particular embodiments, these signals may be indicative of a light signal 204a-204c that correspond to the plurality of light sources 202a-202c, respectively. In particular embodiments, the virtual reality headset 132 may capture the plurality of light signals 204a-204c within a plurality of frames 206a-206c at a particular frame rate. Each of the frames 206a-206c may capture a light intensity 208a-208b that is received by the inside-out cameras. In particular embodiments, the inside-out cameras may expose a plurality of pixels that are coupled to the inside-out cameras to the light signals 204a-204c for a time period (e.g., a fraction of a second). The exposure may generate a light intensity value for each pixel of the plurality of pixels. In particular embodiments, the virtual reality headset 132 may determine its position within a real-world landscape, a position of a user, and a position of the one or more objects based on the received signals. In particular embodiments, the virtual reality headset 132 may capture a plurality of frames 206 at different points in time 210a-210c. While only three frames 206a-206c are shown, there may be a plurality of frames between the time interval 210a-210c and any other point in time. FIG. 2 shows an embodiment where frames 206a-206c may be captured at times 210a-210c, respectively. In particular embodiments, the frames 206a, 206c may have a light intensity value 208a and the frame 206b may have a light intensity value 208b. In particular embodiments, the light intensity value 208a is greater than the light intensity value 208b as shown by more light signals are captured in frames 206a, 206c than frame 206b.

In particular embodiments, the light sources 202a-202c may have a different frequency at which it operates compared to the frame rate capturing the frames 206. The difference in frequency from the frame rate may lead to each frame 206 not capturing the same amount of light intensity from the light sources 202a-202c at given times and yield an illumination source intensity variation, such as perceptible flicker (e.g., a slight dimming of the image quality shown to the user of the scene). In particular embodiments, flicker may be the periodic variation in emitted light output from light sources (e.g., filaments, LEDs, etc.). In particular embodiments, light sources may often be powered by an alternating current. The alternating current (AC) supply may cause the output intensity of light to vary with a period that is a multiple of the AC supply. As an example and not by way of limitation, a 50 Hz AC may produce flicker at 100 Hz, while a 60 Hz AC may produce flicker at 120 Hz. Flicker may be prevalent in present-day light sources, and accordingly, head-mounted displays (e.g., virtual reality headset 132) may often be used in environments where flicker is present. As such, in particular embodiments, the virtual reality headset 132 may detect the flicker and alert the user to modify and/or modify the frame rate to adjust to remove any perceptible flicker. In particular embodiments, the virtual reality headset 132 may detect the flicker and present the user an interactive element which may be selectable to cause the one or more cameras to capture frames at a different frame rate. The change in frame rate may resolve the flicker issue by causing the frame rate to capture a more constant light intensity value 208 within each frame 206. In particular embodiments, the virtual reality headset 132 may automatically change the frame rate in response to detecting the flicker. In particular embodiments, if flicker is still detected after a change in frame rate, the virtual reality headset 132 may revert back to the original frame rate.

In particular embodiments, the virtual reality headset 132 may calculate a light intensity metric associated with the light intensity 208 in a given frame 206. In particular embodiments, the virtual reality headset 132 may calculate a mean light intensity for each captured frame 206a-206c. In particular embodiments, the mean light intensity may be calculated by taking all light intensity values received from all of the pixels within a single frame 206 and averaging the light intensity values across all of the pixels. In particular embodiments, the mean light intensity for a given frame 206 may be calculated from multiple cameras by averaging the light intensity values across all of the pixels from the multiple cameras.

Figure 3:
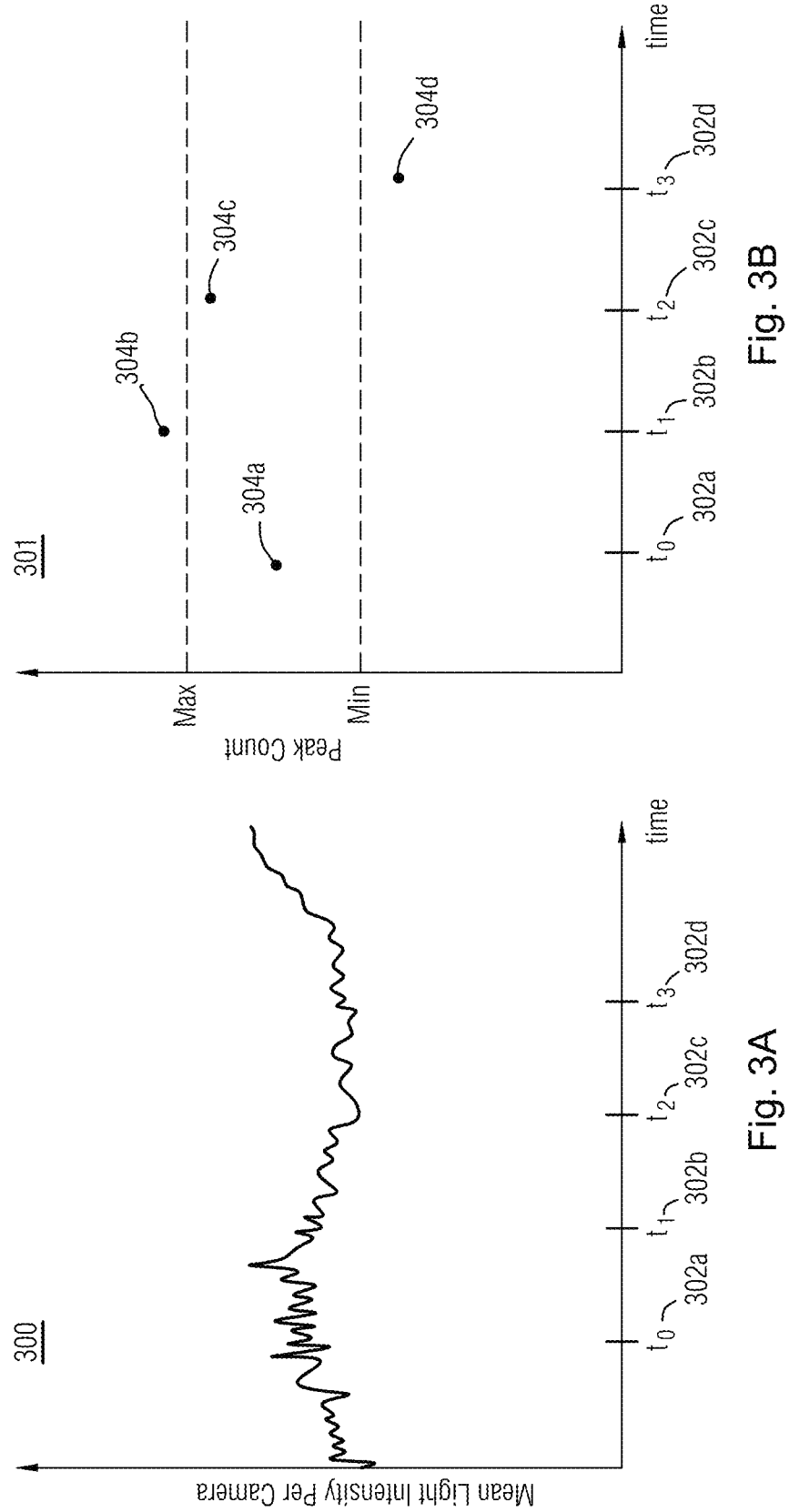
FIGS. 3A-3B illustrate example graphs of measurements associated with received light signals by a virtual reality system.

FIG. 3A is an example graph 300 of measured mean light intensity per camera. In particular embodiments, the measured mean light intensity may be calculated from one or more cameras as described above. The mean light intensity captured in a plurality of frames are plotted along a time-axis with various points in time 302a-302d. As shown in FIG. 3A, at various points in the graph 300, the mean light intensity may have many peaks (e.g., between t0 302a and t1 302b) and the mean light intensity may have a small number of peaks (e.g., between t2 302c and t3 302d). As the virtual reality headset 132 captures the frames 206, the mean light intensity may vary from frame-to-frame 206. In particular embodiments, the peaks may be the local minima or local maxima throughout a period of time. In particular embodiments, the virtual reality headset 132 may detect the peaks of mean light intensities captured within a plurality of frames 206 within a given time period. As an example and not by way of limitation, the given time period may be 1 second. In particular embodiments, the virtual reality headset 132 may detect the peaks of mean light intensities captured within a frame window of the plurality of frames 206. The frame window may be a number of frames of the plurality of frames 206. In particular embodiments, the virtual reality headset 132 may subdivide the plurality of frames 206 into sets of frames 206, where each set of frames 206 may include an equal number of frames. The virtual reality headset 132 may determine the number of detected peaks within the given set of frames.

FIG. 3B illustrates an example graph of detected peaks 304a-304d within a given time period. These detected peaks 304a-304d may correspond to the points in time 302a-302d, respectively. As an example and not by way of limitation, the detected number of peaks 304a may correspond to the number of peaks detected within the time period from time 0 to time t0 302a. The detected number of peaks 304b may correspond to the number of peaks detected within the time period from time t0 302a to time t1 302b and so on. In particular embodiments, the virtual reality headset 132 may determine a minimum number of peaks associated with a perceptible flicker and a maximum number of peaks associated with a perceptible flicker. Where the minimum number of peaks may indicate a likelihood of perceptible flicker and anything below the threshold minimum number of peaks may be disregarded as not likely in resulting in a perceptible flicker. In particular embodiments, the maximum number of peaks may indicate a strong likelihood of perceptible flicker and any number of detected peaks above the maximum may indicate a perceptible flicker. As an example and not by way of limitation, the number of detected peaks 304d may indicate no perceptible flicker, but the number of detected peaks 304b may indicate a perceptible flicker within their respective time frames. In particular embodiments, the virtual reality headset 132 may determine a likelihood of perceptible flicker based on the detected peaks 304 within different time intervals 302. In particular embodiments, each number of detected peaks 304 may represent a local flicker probability. In particular embodiments, the virtual reality headset 132 may use an algorithm to determine the likelihood of perceptible flicker. As an example and not by way of limitation, the algorithm may be a logarithm-odds equation to determine the likelihood of perceptible flicker. The virtual reality headset 132 may determine a probability of a perceptible flicker based on the number of detected peaks 304. In particular embodiments, there may be a probability value of a perceptible flicker associated with the number of detected peaks 304 within a given time interval 302. The number of detected peaks 304 within a given time interval 302 may correspond to a local flicker probability, which would represent a probability value of perceptible flicker for a given time interval 302. In particular embodiments, the likelihood of perceptible flicker may be based on the probability of perceptible flicker for multiple time intervals 302. As such, the likelihood of perceptible flicker may be based on the local flicker probability over several time intervals 302. In particular embodiments, the likelihood of perceptible flicker may be a temporal integration of each local flicker probability of each time interval 302. The temporal integration may be over any number of time intervals 302. In particular embodiments, the likelihood of perceptible flicker may be calculated based on the local flicker probabilities associated with multiple time intervals 302. In particular embodiments, the virtual reality headset 132 may initially determine a likelihood of perceptible flicker for each time interval 302, which may be a local flicker probability. After determining the likelihood of perceptible flicker for each time interval 302, the virtual reality headset 132 may determine an overall likelihood of perceptible flicker based on the local flicker probabilities. In particular embodiments, the likelihood of perceptible flicker may be based on a historical time period occurring prior to the current time interval. As an example and not by way of limitation, while during the time interval between time t2 302c to time t3 302d, the likelihood of perceptible flicker is low, in a previous time interval, t1 302b to t2 302c, there is a likelihood of perceptible flicker. Even though in a current time period 302, there may be a low likelihood of perceptible flicker, the virtual reality headset 132 may account for previous calculations to determine whether there have been past high likelihoods of perceptible flicker. The accounting of previous calculations may correspond to the temporal integration of the local flicker probabilities. In particular embodiments, the virtual reality headset 132 may give a first weight to the current time period 302 and a second weight to a historical time period. The virtual reality headset 132 may apply different weights to any number of different time intervals 302. As an example and not by way of limitation, the virtual reality headset may heavily weigh the current time interval 302, apply a factor of 0.7 to the second most recent time interval 302, and a factor of 0.5 to the third most recent time interval 302.

In particular embodiments, once the virtual reality headset 132 has determined the likelihood of perceptible flicker exceeds a predetermined threshold, the virtual reality headset 132 may cause the one or more cameras to change frame rates to reduce or eliminate the perceptible flicker. As an example and not by way of limitation, if the frequency of light sources are 60 Hz and the frame rate is 50 frames per second, the virtual reality headset 132 may determine a high likelihood of perceptible flicker. The virtual reality headset 132 may change the frames per second to 60 frames per second to synchronize the frames captured per second to the frequency of the light sources to eliminate perceptible flicker. In particular embodiments, the perceptible flicker may be indicative of an offset between the frequency of the light sources and the frame rate. The offset may indicate each frame cannot capture an equal amount of light. As an example and not by way of limitation, if the frame rate is 50 frames per second and the frequency of light sources is 60 Hz, each frame cannot capture an equal amount of light from the light sources because the sinusoidal curve associated with the light sources would be different in each frame captured.

Figure 4:
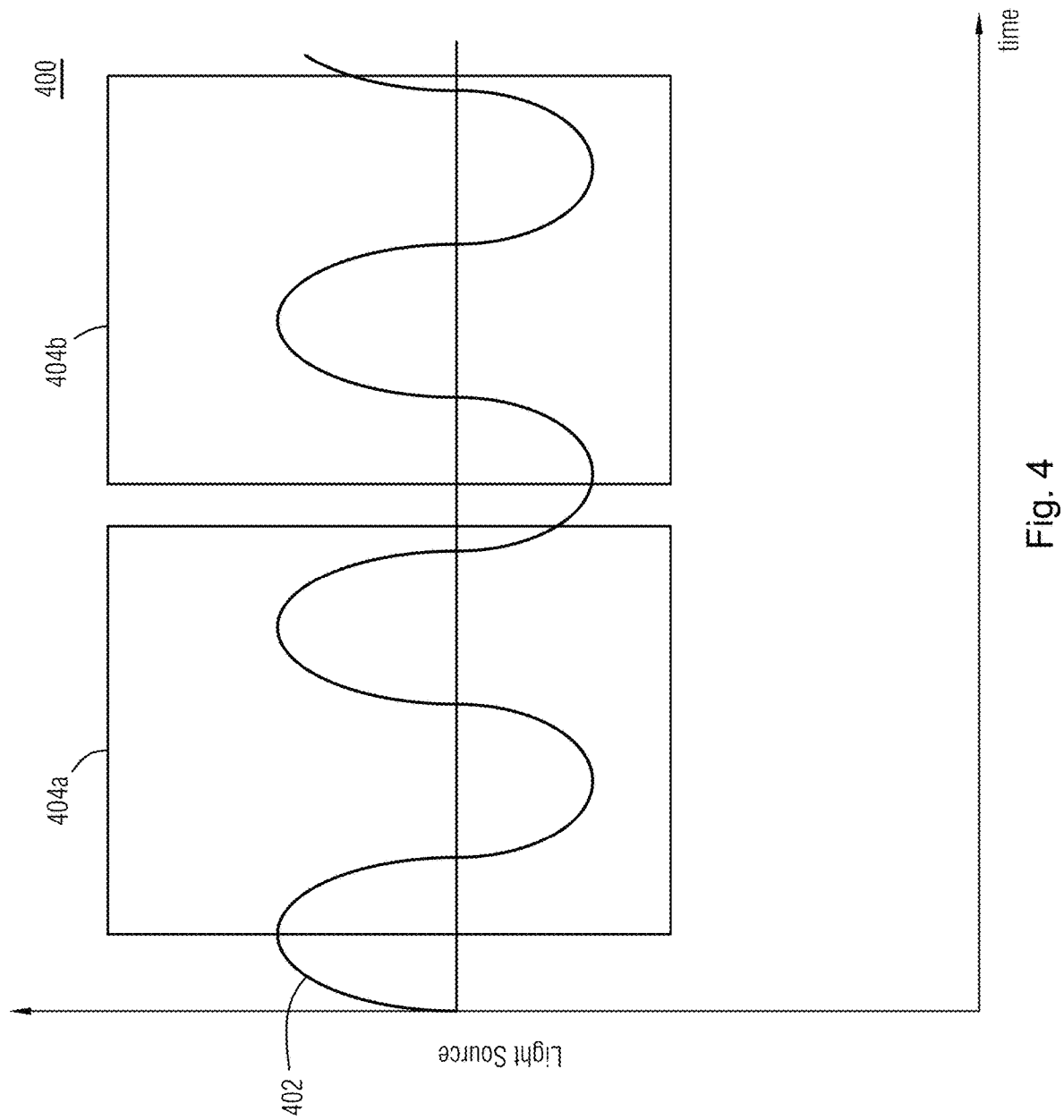
FIG. 4 illustrates an example graph of a light signal being captured within a plurality of frames.

FIG. 4 illustrates a graph 400 of a light signal 402 being captured within a plurality of frames 404. In particular embodiments, the frames 404 may be captured in predefined time intervals. Notably, the graph 400 illustrates when the frequency of the light source is not synchronized with the frame rate. As shown in FIG. 4, the frames 404a and 404b may capture a different amount of the light signal 402. The frame 404a may capture a larger amount of light intensity than the frame 404b. The differences in captured light intensities may result in a perceptible flicker that is detected by the virtual reality headset 132. Although there may be other reasons as to why captured light intensities are lower within one frame versus another frame, such as movement of the virtual reality headset may cause some inaccuracies, occlusion of part of the cameras during periods of time (e.g., waving hands in a gesture), the virtual reality headset may account for the short term discrepancies and use a historical likelihood of perceptible flicker to determine whether a perceptible flicker is actually detected.

Figure 5:
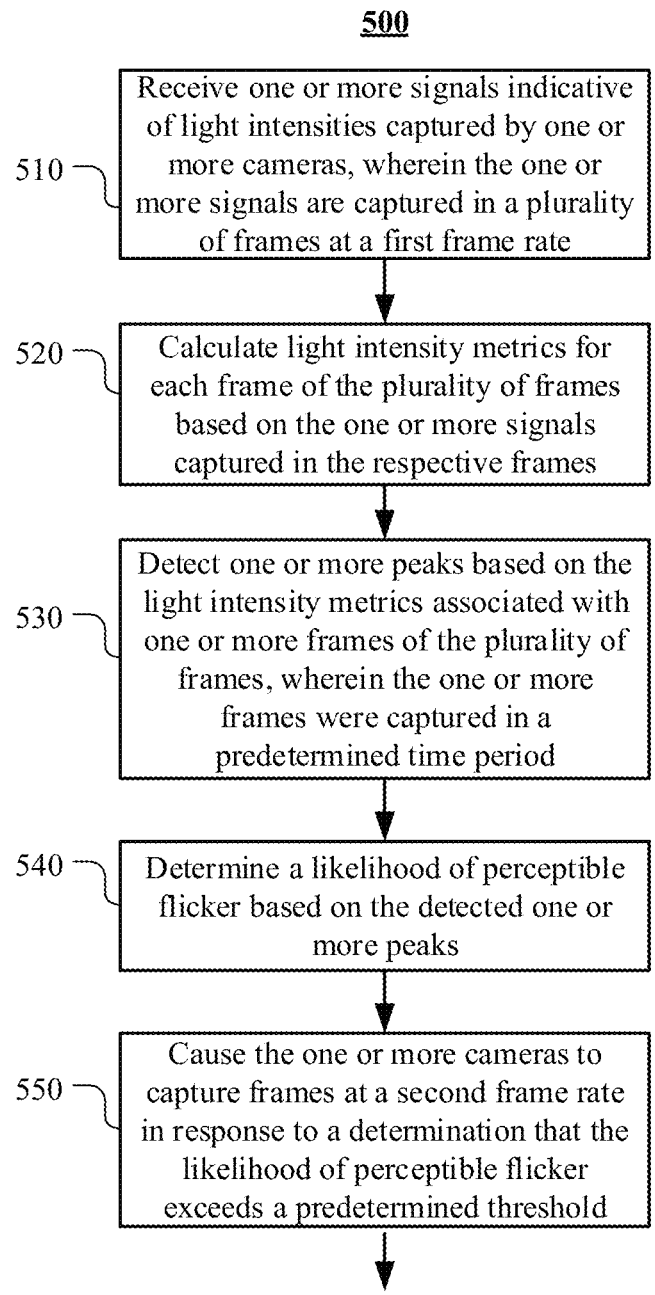
FIG. 5 illustrates an example method for detecting a perceptible flicker.

FIG. 5 illustrates an example method 500 for detecting a perceptible flicker. In particular embodiments, a virtual reality headset 132 may be used to detect the perceptible flicker. The method may begin at step 510, where a computing system (e.g., virtual reality system) may receive one or more signals indicative of light intensities captured by one or more cameras. In particular embodiments, the one or more signals may be captured in a plurality of frames at a first frame rate. At step 520, the computing system may calculate light intensity metrics for each frame of the plurality of frames based on the one or more signals captured in the respective frames. At step 530, the computing system may detect one or more peaks based on the light intensity metrics associated with one or more frames of the plurality of frames. In particular embodiments, the one or more frames may be captured in a predetermined time period. At step 540, the computing system may determine a likelihood of perceptible flicker based on the detected one or more peaks. At step 550, the computing system may cause the one or more cameras to capture frames at a second frame rate in response to a determination that the likelihood of perceptible flicker exceeds a predetermined threshold. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sending sensor data to an authorized application, including the particular steps of the method of FIG. 5, this disclosure contemplates any suitable method of sending sensor data to an authorized application, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Although this disclosure describes and illustrates processes in context of a virtual reality headset 132 performing various functions, a computing system (e.g., a server embodied as social-networking system 160 or third-party system 170) may handle the processing and send the results to a virtual reality headset 132. In particular embodiments, a computing system may receive signals indicative of light intensities captured by one or more cameras coupled to a virtual reality headset 132 and perform processes described above to determine a likelihood of perceptible flicker. After determining the likelihood, the computing system may send back to the virtual reality headset 132 an indication of whether there is a likelihood of perceptible flicker and cause the virtual reality headset 132 to change frame rates.

Figure 6:
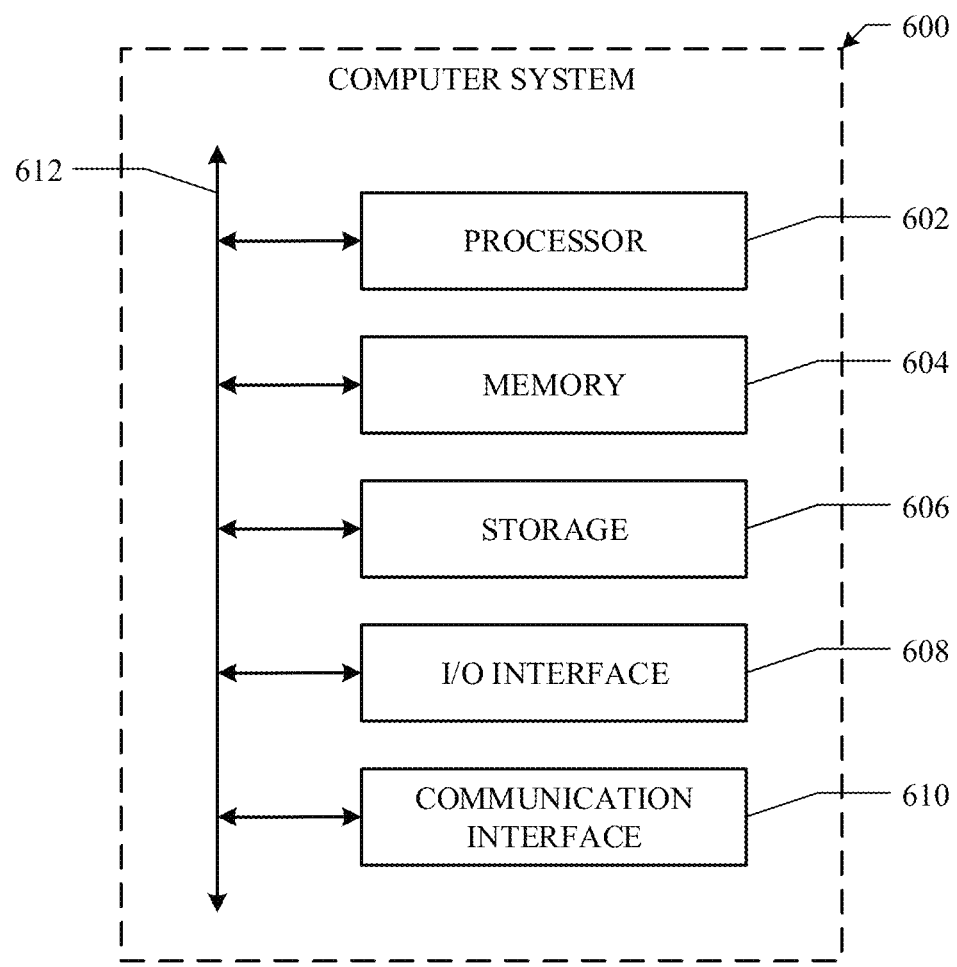
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving one or more signals indicative of light intensities captured by one or more cameras, wherein the one or more signals are captured in a plurality of frames at a first frame rate;
   calculating light intensity metrics for each frame of the plurality of frames based on the one or more signals captured in the respective frames;
   detecting one or more peaks based on the light intensity metrics associated with one or more frames of the plurality of frames, wherein the one or more frames were captured in a predetermined time period;
   determining a likelihood of perceptible flicker based on the detected one or more peaks; and
   causing the one or more cameras to capture frames at a second frame rate in response to a determination that the likelihood of perceptible flicker exceeds a predetermined threshold.

2. The method of claim 1, wherein the one or more signals are emitted from one or more light sources.

3. The method of claim 1, wherein the one or more cameras are coupled to a head-mounted display.

4. The method of claim 1, wherein the computing system comprises a head-mounted display.

5. The method of claim 4, further comprising:
   determining one or more of a position of the computing system, a position of a user associated with the computing system, and a position of one or more objects.

6. The method of claim 1, wherein capturing the one or more signals comprises exposing a plurality of pixels coupled to each of the one or more cameras to the one or more signals for a time period, wherein the exposure generates a light intensity value for each pixel of the plurality of pixels.

7. The method of claim 6, wherein calculating the light intensity metrics for each frame comprises calculating a summed light intensity value by adding the light intensity values for each pixel of the plurality of pixels coupled to the one or more cameras captured within the respective frame and dividing the summed light intensity value by a number of pixels within the plurality of pixels.

8. The method of claim 1, further comprising:
   subdividing the plurality of frames into a plurality of sets of frames, wherein each set of frames comprises an equal number of frames; and
   determining a number of peaks within each set of frames.

9. The method of claim 1, wherein determining the likelihood of perceptible flicker further comprises:
   determining a quantitative measure of the detected one or more peaks associated with the predetermined time period; and
   determining, based on a comparison of the quantitative measure to one or more threshold quantitative measures, a second likelihood of perceptible flicker associated with the predetermined time period;
   wherein the likelihood of perceptible flicker is determined based on the second likelihood of perceptible flicker associated with the predetermined time period.

10. The method of claim 9, wherein determining the likelihood of perceptible flicker is further based on a third likelihood of perceptible flicker associated with a historical time period occurring prior to the predetermined time period.

11. The method of claim 9, wherein the one or more threshold quantitative measures each corresponds to a probability value.

12. The method of claim 9, wherein the quantitative measure corresponds to a number of the detected one or more peaks associated with the predetermined time period.

13. The method of claim 1, wherein the one or more signals are associated with at least one light source, wherein the perceptible flicker is indicative of an offset between the first frame rate and the at least one light source.

14. The method of claim 1, wherein determining the likelihood of perceptible flicker comprises using a logarithm-odds equation.

15. The method of claim 1, further comprising:
notifying a user of the computing system of the likelihood of perceptible flicker in response to the determination that the likelihood of perceptible flicker exceeds the predetermined threshold.

16. The method of claim 1, further comprising:
presenting a user of the computing system an interactive element which is selectable to cause the one or more cameras to capture frames at the second frame rate in response to the determination that the likelihood of perceptible flicker exceeds the predetermined threshold.

17. One or more computer-readable non-transitory storage media embodying software that is operable when executed to:
receive one or more signals indicative of light intensities captured by one or more cameras, wherein the one or more signals are captured in a plurality of frames at a first frame rate;
calculate light intensity metrics for each frame of the plurality of frames based on the one or more signals captured in the respective frames;
detect one or more peaks based on the light intensity metrics associated with one or more frames of the plurality of frames, wherein the one or more frames were captured in a predetermined time period;
determine a likelihood of perceptible flicker based on the detected one or more peaks; and
cause the one or more cameras to capture frames at a second frame rate in response to a determination that the likelihood of perceptible flicker exceeds a predetermined threshold.

18. A system comprising: one or more processors; and a non-transitory memory coupled to the processors comprising instructions executable by the processors, the processors operable when executing the instructions to:
receive one or more signals indicative of light intensities captured by one or more cameras, wherein the one or more signals are captured in a plurality of frames at a first frame rate;
calculate light intensity metrics for each frame of the plurality of frames based on the one or more signals captured in the respective frames;
detect one or more peaks based on the light intensity metrics associated with one or more frames of the plurality of frames, wherein the one or more frames were captured in a predetermined time period;
determine a likelihood of perceptible flicker based on the detected one or more peaks; and
cause the one or more cameras to capture frames at a second frame rate in response to a determination that the likelihood of perceptible flicker exceeds a predetermined threshold.

\* \* \* \* \*